July 8, 1941.  J. FRIEDMAN  2,248,703
INDEX DIGEST
Filed Jan. 26, 1940
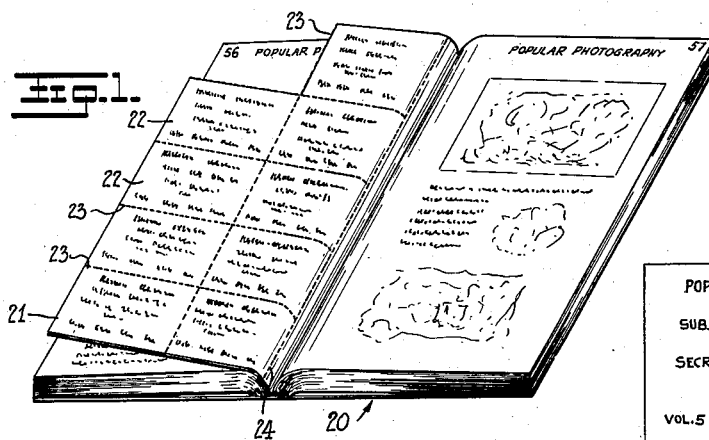
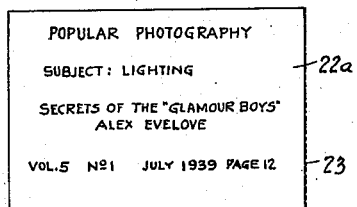
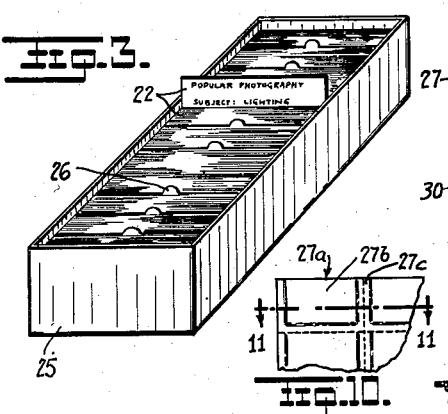
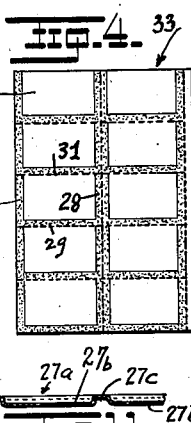
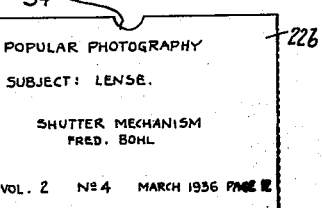
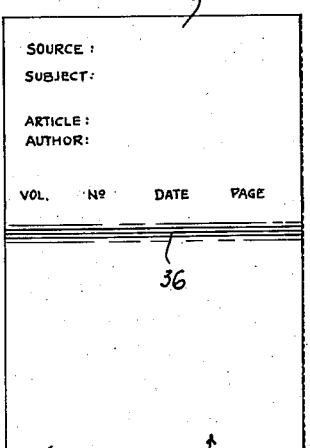
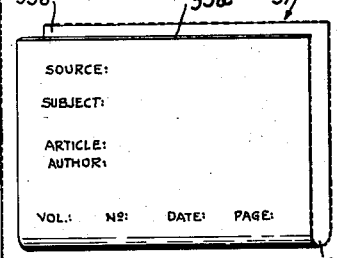
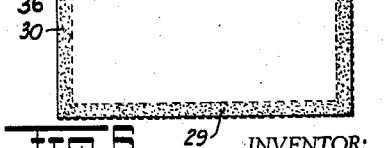
INVENTOR:
JOSEPH FRIEDMAN,
By: Julian J. Wittal,
his ATTORNEY.

Patented July 8, 1941

2,248,703

UNITED STATES PATENT OFFICE 2,248,703

INDEX DIGEST

Joseph Friedman, New York, N. Y.

Application January 26, 1940, Serial No. 315,639

4 Claims. (Cl. 283—63)

This invention relates to methods and means for digesting, indexing and making easily available in a novel manner the contents of a magazine or similar publication, and has for its main object to provide a method and means of this character which will at once make available the contents of the current volume of a magazine or other publication before the usual index and digest of the respective volume as a whole can be made and will be available.

As it is well known, very often it is desirable, and even vitally necessary, to find a certain article in the current issues of a magazine or similar publication, that is, in the issues of the magazine before the completion of a volume and the preparation of the aforementioned general index, or possible digest, for that volume. Very often, it is also desired to find all the articles in the current issues of a publication relating to a certain subject. At present, there is no other way of finding such an article or finding the articles relating to a certain subject, but to look through every number of the publication in the current volume with the added drawback that some articles or notices relating to the subject in view will be overlooked.

My invention has for its main object to provide a method and means whereby this want in the field of publications will be filled.

Another object of my invention is to provide means in connection and in combination with the means for the mentioned main object, whereby other information, notes, articles, etc., relating to the same subject, as digested and indexed for the publication in question and readily received with it, may be collected and made available with said means for the publication in view.

It will be understood that my novel methods and means for the objects mentioned hereinbefore may also be kept accumulated and used as digests and indexes for any number of past volumes of the publication, making their contents available in a novel, practical and efficient manner for all its volumes, and making it unnecessary to provide a regular separate index for each volume or year thereof, as it is the custom with some of the high-class technical publications today.

Other objects of my invention will be apparent as the specification of the same proceeds.

In the drawing, forming a part of this specification and accompanying the same:

Fig. 1 is a perspective view of a magazine embodying my invention;

Fig. 2 is a plan view of a digest and index card separated from the page or leaf in the magazine with which it originally was provided.

Fig. 2a is a rear view of one form thereof;

Fig. 3 is a perspective view of a usual card index system and box for arranging and making available my novel digest cards, and Fig. 4 is a plan view of an additional sheet or page for a publication used in a modified form of my invention in combination with said original card index sheet;

Fig. 5 is a somewhat modified form of an index card, similar to Fig. 2, used in combination with the modification of my invention in which the added sheet of Fig. 4 is used;

Fig. 6 is a plan view of a separated portion of the sheet shown in Fig. 4, to be used on the rear of the card shown in Fig. 5;

Fig. 7 is a perspective view of a pocket or container formed with my modified card index and backing for the same illustrated in Figs. 5 and 6;

Fig. 8 is a plan view of a separated folder index card, being another modified form of my invention, and Fig. 9 is a perspective view indicating the use of the folder index card of Fig. 8;

Fig. 10 is a fragmentary plan view of a portion of a sheet or page in a magazine or other publication constructed according to another modification of my invention, and Fig. 11 is a sectional elevation thereof, the section being taken on the line 11—11 of Fig. 10.

Referring now to the drawing more in detail by characters of reference, the numeral 20 indicates an issue of a magazine or similar publication, in general, and the numeral 21 indicates a novel sheet or page which I propose to prepare for each issue of the magazine and to bind and mail with it.

Page 21 preferably is made of stiffer and heavier material than the usual pages of such magazine or other publications and is sub-divided into individual cards 22 by perforated lines 23. An innermost line of perforations 24 adjacent to the folding or binding line of the magazine, makes it possible to separate the material of the page 21 from the rest of the magazine or publication. An individual card 22a is shown in Fig. 2 and each of such cards will convey the necessary information to find a desired article, note, or information, in the contents of the respective issue of the publication. Each of such cards would preferably show the name of the magazine or publication, the subject of the article or note in issue, the title of the article, the author, and, of course, the date, volume number, and page by which it may be readily found. Of course, a short digest of the article also may be provided on the card for ready information.

According to my invention, each publication or magazine, adopting my novel method and means for such digesting and indexing of its issues, would provide every subscriber with a usual card index box 25 having the usual alphabetic indicator cards 26, and as the individual issues of the magazine are received by the subscriber, page 21 will be separated from the respective issue and then sub-divided into individual digest and index cards and the same alphabetically and/or in subject groups arranged in the box 25, as will be understood, and as indicated in Fig. 3, thereby making the valuable, or more important, contents of the issue at once digested, indexed and readily available for all the future times.

The magazine may accept advertisement or publicity relating to the subject digested for each card and print on the rear thereof such advertisement or publicity, as shown in Fig. 2a, thereby aiding its readers, since they may at once find the business firms providing material and devices necessary for the practice of the subject digested. At the same time, the magazine or publication would open up a new source of income from such advertisements.

A modified form of my invention is indicated in Figs. 5, 6 and 7. In this modification, the individual card 22b is similar to the card 22a and is provided with the magazine in a page entirely similar to page 21 described hereinbefore.

A separate second card cover or back 27 is, however, provided on the rear of every individual card 22b, said cover or back 27 preferably being provided with glued strips or areas 28, 29 and 30, around three of its marginal portions, the fourth marginal portion 31 being left without said strip of glue or other adhesive. Each card or piece of sheet material 27 will be glued on an index card 22b, as described hereinbefore, and the page 21 mailed this way with the magazine. Upon the separation of the individual cards 22b, each will have the form of a small pocket or container 22c, as indicated in Fig. 7, open at the top 32, and will be arranged in the card index box 25 in the usual manner. It will be seen that this way I provide a small pocket or container 22c with every card, and the purpose thereof is that in case the reader or user finds notes, articles, or other information anywhere else, relating to the same subject matter as digested on the card 22b, such notes, information, possibly clippings of other printed matter, may be collected in the pocket 22c of the card 22b and made available with the article to which said card relates, giving the reader or user at once all the information he was able to collect relating to the subject matter of the card 22b.

In a modified form of the invention illustrated in Figs. 5 to 7, a second page 33 may be provided in the magazine, containing the back or cover cards or slips 27, as illustrated in Fig. 4, and said page may be provided separately in the respective issue of the publication, similarly to the page 21, or the same may be previously applied in the manufacturing of the publication on the rear of the page 21, by its glued strips 28 to 30, and upon separation of the index cards in the page 21, the pockets 22c will be readily available, or may be made by the user in a quick and easy manner.

To make the pockets easier to access, their cards 22b may have a recessed or cut out portion 34 at their tops, or small tabs may be provided, similar to those used with the alphabetic separating cards 26. For the same purpose, the rear covers or sheets 27 may also be manufactured in the manner illustrated in Figs. 10 and 11, in which each card 27a is depressed in its major portion, as indicated at 27b, only its glued circumferential portions 27c being left in its original plane. Such card will provide pockets which have certain original widths for ready insertion of clippings and other notes.

In Figs. 8 and 9, finally, I illustrate another modification of my invention, in which page 21 would be made up by individual sections generally indicated by the numeral 35, comprising a usual index card 35a, and a rear or back 35b for the same. After separation, the section 35 may be folded on its center line, indicated by the dash lines 36 thereby providing a folder 37, as illustrated in Fig. 9, and such folders may be filed in the index card box 25. The clippings or other notes may then be inserted in the respective folders 37.

Of course, similar folders may be provided also by omitting the side glued strip 28 and 30 in the rear covers or pieces of sheet material 27 in the earlier modification and leaving only the bottom adhesive strip 29, thereby to secure each rear sheet 27 on a front card 22b.

What I claim as new, is:

1. For digesting and indexing the contents of a publication, in combination, a publication, a page in the publication sub-divided into rectangular card units, each card unit carrying a digest and identifying information of an article in the publication, said page being adapted to be separated into the individual cards thereof to be used in a card index system, a rear sheet for each card, separable therewith, secured on the card around three of its marginal portions, the fourth one being left open to provide a pocket on the rear of each card for collecting further material relating to the matter digested on the respective card.

2. For digesting and indexing the contents of a publication, in combination, a publication, a page in the publication sub-divided into rectangular card units, each card unit carrying a digest and identifying information of an article in the publication, said page being adapted to be separated into the individual cards thereof to be used in a card index system, a second page in said publication sub-divided into separable sheets corresponding to said cards in said first page, and means on the separable sheets of said second page, whereby the same may be secured on the respective cards by a portion of their marginal edges, so as to form a container with the respective card to collect additional material relating to the subject digested on the respective card.

3. For digesting and indexing the contents of a publication, in combination, a publication, a page in the publication sub-divided into rectangular card units, each card unit carrying a digest and identifying information of an article in the publication, said page being adapted to be separated into the individual cards thereof to be used in a card index system, a second page in said publication sub-divided into separable sheets corresponding to said cards in said first page, and means on the separable sheets of said second page, whereby the same may be secured on the respective cards by a portion of their marginal edges, so as to form a container with the respective card to collect additional material relating to the subject digested on the respective cards, the portions of the sheets of said second page not adapted to be secured on the respective cards being depressed so as to be at a desired distance from the respective cards when said sheets are secured on said cards so as to provide larger useful space within each container formed at the rear of the respective cards.

4. For digesting and indexing the contents of a publication, in combination, a publication, a page in the publication sub-divided into rectangular card units, each card unit carrying a digest and identifying information of an article in the publication, said page being adapted to be separated into the individual cards thereof to be used in a card index system, a second page in said publication sub-divided into separable sheets corresponding to said cards in said first page, each sheet having three of its marginal portions coated with adhesive, whereby the separable sheets may be secured around three of their sides on the respective cards so as to form containers to collect additional material relating to the subjects digested on the respective cards.

JOSEPH FRIEDMAN.